United States Patent [19]

Weevers

[11] Patent Number: 4,747,426
[45] Date of Patent: May 31, 1988

[54] CHECK VALVE

[75] Inventor: Henri H. Weevers, Gouda, Netherlands

[73] Assignee: Mokveld Valves B.V., Gouda, Netherlands

[21] Appl. No.: 33,169

[22] Filed: Mar. 31, 1987

[30] Foreign Application Priority Data

Apr. 2, 1986 [DE] Fed. Rep. of Germany ....... 3610965

[51] Int. Cl.⁴ ............................................. F16K 17/30
[52] U.S. Cl. ................................... 137/220; 137/514.7
[58] Field of Search ................... 137/220, 514.5, 514.7

[56] References Cited

U.S. PATENT DOCUMENTS

| 931,532 | 8/1909 | Wainwright | 137/514.7 |
|---|---|---|---|
| 1,258,167 | 3/1918 | Vollmann | 137/514.7 |
| 3,134,394 | 5/1964 | Ohta | 137/514.7 X |
| 4,168,721 | 9/1979 | Mueller | 137/514.7 |
| 4,287,911 | 9/1981 | Houdeshell | 137/514.7 X |
| 4,638,832 | 1/1987 | Mokveld | 137/514.5 X |

Primary Examiner—Robert G. Nilson
Attorney, Agent, or Firm—W. G. Fasse; D. H. Kane, Jr.

[57] ABSTRACT

A check valve or non-return valve has a valve body (9) which is connected with a piston (15) by a rod (14). The piston is guided by a sleeve (17) mounted inside an inner housing of the valve. The sleeve is provided with two radially extending openings (21, 22) which are axially spaced from each other. These openings provide communication between the inner space in the sleeve and the inner space in the inner housing (1) depending on the position of the piston (15). This structure permits a rapid closing of the valve, whereby nevertheless, the pressure shock caused by the rapid movement of the valve body is substantially reduced by these openings causing a pressure build-up inside the sleeve with a respective damping action on the valve body.

4 Claims, 1 Drawing Sheet

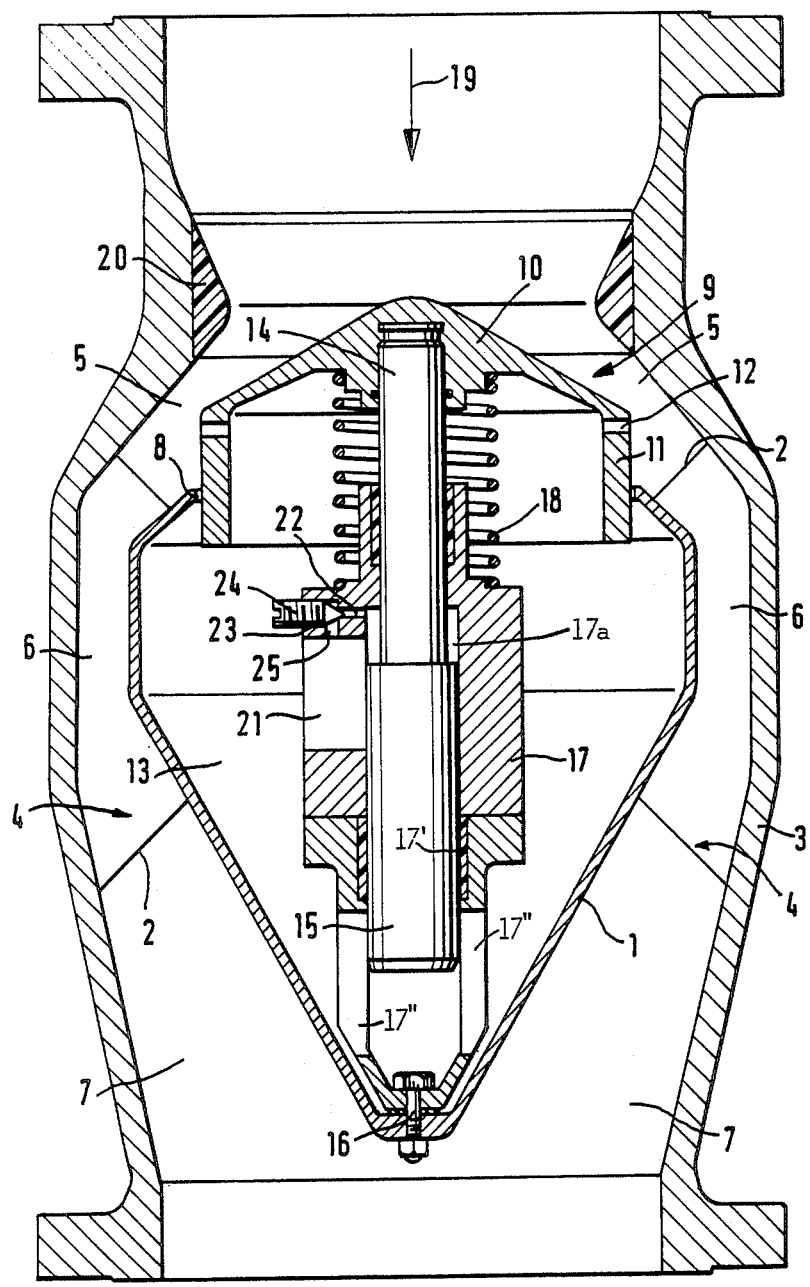

CHECK VALVE

FIELD OF THE INVENTION

The invention relates to a check valve, also referred to as a non-return valve, having inner and outer housings usually of rotational symmetry. Such valves are used, for example, in pipelines.

DESCRIPTION OF THE PRIOR ART

U.S. Pat. No. 4,638,832 (Mokveld) discloses a valve of this type. The inner valve housing is mounted inside the outer valve housing to form a flow passage between the two housings, whereby the flow passage is subdivided by the connecting lands between the inner and outer housings. The flow passage forms a ring space interrupted by the mounting lands. A valve body is coaxially movable under the force of a spring against the flow direction of the flow medium and out of the inner housing against a valve seat formed on the inner surface of the outer housing by a sealing ring. The spring force presses the valve body against the sealing ring for closing the flow passage formed in the ring space. For this purpose the valve body comprises a conical section facing the sealing ring and a cylindrical jacket section reaching into the inner housing. At least one aperture extends radially through the jacket of the valve body in a zone near the transition area between the facing section and the jacket section. This aperture interconnects the ring space between the inner and outer housing with the space inside the inner housing for the purpose of controlling oscillating movements of the valve body also referred to as the slide piston.

The radially extending apertures are to avoid oscillations in any piston position. Such oscillations are actually favored by secondary flows causing an ejector action inside the inner housing. In the prior art the radial apertures avoid the oscillations in any position of the piston because the apertures are so located that they necessarily participate in a change in the position of the valve body or piston. Thus, the flow conditions inside the housing remain basically unchanged.

However, in prior art valves of the type described, substantial pressure peaks or shocks are caused by an accelerated transition of the valve piston into the closing position. On the one hand an accelerated closing movement of the valve piston is desired in order to avoid a back flow of the flowing medium as much as possible if the valve needs to be closed. On the other hand, the pressure peaks are highly undesirable because the resulting impact of the valve piston conical front end on the sealing ring is wearing out the sealing ring and because bouncing of the valve piston may result.

OBJECTS OF THE INVENTION

In view of the foregoing it is the aim of the invention to achieve the following objects singly or in combination:

to improve a check valve or non-return valve of the type described above in such a way that the valve piston may be moved relatively rapidly into its valve closing position, whereby the resulting pressure peak is substantially reduced; and to maintain all the advantages of the prior art valve.

SUMMARY OF THE INVENTION

The check valve according to the invention is characterized in that the valve body or slide piston is connected with a further piston by a rod and the further piston is guided in a sleeve mounted inside the inner housing. The sleeve is provided with at least two radially extending, axially displaced openings which provide communication between the inner space of the sleeve and the inner space of the inner housing as a function of the position of the piston for damping especially the end part of a valve closing motion.

The radially extending openings according to the invention in the wall of the sleeve which guides the further piston, make sure that the motion of the further piston into the closing position of the valve body initially is completely unhindered because the formation of a pressure buffer is prevented by the radial openings which remain substantially open at this time or rather in this position of the further piston. However, toward the end of the forward stroke of the piston in the direction toward the closing position of the valve body only one radial upper opening is still open. Thus, an excess pressure is being built up inside the guide sleeve depending on the size of the free cross-sectional flow of this upper opening. This excess pressure is sufficient to damp the final portion of the valve closing movement of the piston to such an extent that an impact type contact of the valve body on the sealing ring is avoided.

BRIEF DESCRIPTION OF THE DRAWING

In order that the invention may be clearly understood, it will now be described, by way of example, with reference to the single FIGURE of the accompanying drawing showing an axial, sectional view through a valve according to the invention.

DETAILED DESCRIPTION OF PREFERRED EXAMPLE EMBODIMENTS AND OF THE BEST MODE OF THE INVENTION

The check valve comprises primarily an inner housing 1 of rotational symmetry held by lands 2 concentrically in an outer housing 3. A flow passage 4 interrupted by the lands 2 is formed between the inner surface of the outer housing and the outer surface of the inner housing in such a way that in a portion 5 of the flow passage the speed of a medium flowing in the direction of the arrow 19 is increased while the speed in a portion 6 of the flow passage remains approximately constant. A further portion 7 of the flow passage widens in its flow cross-sectional area, whereby the pressure is reduced. The flow section or portion 7 is so constructed that it functions as a diffuser as much as possible.

A valve body 9 is movable out of the inner housing 1 through an opening 8 facing axially and concentrically to the longitudinal axis of the valve. The valve body 9 comprises a conical front end 10 and a cylindrical jacket 11. Radial bores 12 are provided in the transition zone between the conical section 10 and the cylindrical section as described in more detail in U.S. Pat. No. 4,638,832. These radial bores 12 communicate the inner space 13 of the inner housing 1 with the flow passage section 4.

The valve body 9 is attached to an upper end of a rod 14, the lower end of which carries a piston 15 opposite the valve body 9. The rod 14 and the piston 15 are guided inside a sleeve 17 which is mounted inside the inner housing 1 by mounting means 16 such as a bolt or the like. A helical spring 18 bears with its lower end against a seat on the upper end of the sleeve 17. The upper end of the spring 18 bears against the valve body 9. In the absence of a pressure caused by a medium flowing in the direction of the arrow 19, the bias of the spring 18 will keep the valve body 9 pressed against the valve seat formed by a sealing ring 20. The sealing ring 20 is secured to the inner surface of the outer valve housing in a force-locking and form-locking manner. The sleeve 17 is provided with a seal 17' for the piston 15. The sleeve 17 encloses at its upper end a cylindrical space 17a in which the piston 15 is movable. The lower end of the sleeve 17 is provided with openings 17" so that the inner space of the sleeve communicates with the inner space of the housing 1.

According to the invention two radially extending openings 21 and 22 are provided in the side wall of the sleeve 17. These openings are axially spaced from each other. Depending on the instantaneous position of the piston 15, these openings 21 and 22 communicate the space 17a inside the sleeve 17 with the space 13 inside the housing 1. The cross-sectional flow area through the openings 21 and 22 depends on the instantaneous position of the piston 15 which first closes the opening 21 on its way upwardly in a valve closing direction. The uppermost opening 22 is closed only just prior to the time when the piston 15 reaches its uppermost valve closing position. The cross-sectional flow area of the opening 22 is substantially smaller than the cross-sectional flow area of the opening 21. Further, due to the location of the opening 22 near or at the point where the closing position is about to be reached, the damping of the closing motion of the valve body 9 reaches its maximum just prior to the contact with the sealing ring 20.

A threaded channel 23 is arranged in the wall of the sleeve 17 coaxially with the opening 22. A throttle member in the form of an adjustable screw 24 is received in the threaded channel 23. Depending on the extent of penetration of the throttle member 24 with its tip into the opening 22, the cross-sectional flow area of the opening 22 is increased or decreased so that the level of excess pressure in the space 17a may be adjusted for achieving the desired damping or deceleration of the piston movement just prior to reaching its valve closing position. For example, with this arrangement of the throttle member 24 it is possible to obtain an optimal damping value when the adjustment throttle member 24 is in a position in which the flow cross-sectional area of the opening 22 is at a minimum for obtaining the desired damping characteristic for the valve body 9.

A connecting channel 25 is provided in the wall portion of the sleeve 17 between the openings 21 and 22 so that the openings can communicate with each other through the channel 25 which is so located that it is also influenced by the position of the adjustment throttle member 24.

By shaping the conical inner end of the throttle member 24 in accordance with the desired control function, it is possible to provide a continuous or stepless adjustment of the cross-sectional area of the opening 22 and of the channel 25.

Although the invention has been described with reference to a specific example embodiment, it will be appreciated that it is intended to cover all modifications and equivalents within the scope of the appended claims.

What I claim is:

1. A check valve comprising an outer housing enclosing an inner space of rotational symmetry, an inner housing having a rotational symmetry, connecting lands for centrally locating the inner housing in said inner space of said outer housing to form a flow passage axially divided by said connecting lands between the inner and outer housings, a valve body held in said inner housing for shutting-off said flow passage, spring means for normally biasing said valve body into a closed position against the flow direction of a medium flowing through the flow passage, said valve body being movable coaxially out of the inner housing, said valve body having a conical facing section for cooperation with a sealing ring and a cylindrical jacket section having at least one radially extending aperture near a transition zone between said conical facing section and said cylindrical jacket section for connecting said flow passage with a space inside the inner housing, said valve body further comprising a piston and a piston rod connecting said valve body with said piston, said inner housing comprising a sleeve forming a guide channel for guiding said piston, said sleeve having a wall with at least two axially displaced radially extending openings for communicating an inner space forming said guide channel in said sleeve with an inner space inside said inner housing depending on the instantaneous position of said piston, and wherein one opening of said radially extending openings through said wall of said sleeve is arranged directly near an end face of said guide channel inside said sleeve, wherein said one opening has a cross-sectional flow area smaller than a cross-sectional flow area of any other radially extending opening through said sleeve, wherein said sleeve is provided with a threaded channel extending coaxially to said radially extending opening having said smaller cross-sectional flow area, said valve further comprising throttling means including a position adjustable threaded member threadable into said threaded channel for adjusting said smaller cross-sectional flow area of said at least one radially extending opening for controlling a damping action on said valve body.

2. The check valve of claim 1, wherein said at least one radially extending opening is located for being closed last by said piston when said valve body moves in the direction toward a valve closing position.

3. The check valve of claim 1, further comprising a connecting channel in said wall of said sleeve in a transition area between said threaded channel and the respective radially extending opening, said connecting channel communicating said radially extending openings with each other.

4. The check valve of claim 3, wherein said position adjustable threaded member has a conical tip so shaped that the size of the flow area of the respective opening and the flow area through said connecting channel are adjustable simultaneously by said position adjustable threaded member.

* * * * *